(12) United States Patent
Van Datta et al.

(10) Patent No.: US 7,606,920 B2
(45) Date of Patent: Oct. 20, 2009

(54) METHOD AND APPARATUS FOR CONTROLLING COMMUNICATION PORTS FOR AN ONLINE SESSION OF A MULTI-USER APPLICATION BY ASSOCIATING EACH OF THE PORTS WITH A PROTOCOL AND DESIGNATING AN ACTIVE PORT

(75) Inventors: Glen Van Datta, San Diego, CA (US); Adam Harris, Foster City, CA (US)

(73) Assignee: Sony Computer Entertainment America Inc., Foster City, CA (US)

( * ) Notice: Subject to any disclaimer, the term of this patent is extended or adjusted under 35 U.S.C. 154(b) by 1497 days.

(21) Appl. No.: 10/211,129

(22) Filed: Jul. 31, 2002

(65) Prior Publication Data

US 2003/0217156 A1    Nov. 20, 2003

Related U.S. Application Data

(60) Provisional application No. 60/381,758, filed on May 17, 2002.

(51) Int. Cl.
*G06F 13/00* (2006.01)
(52) U.S. Cl. ...................................... 709/230
(58) Field of Classification Search .................. 709/230
See application file for complete search history.

(56) References Cited

U.S. PATENT DOCUMENTS 5,630,757 A    5/1997   Gagin et al.
5,682,139 A    10/1997  Pradeep et al.

(Continued)

FOREIGN PATENT DOCUMENTS

EP    1 125 617 A2    8/2001

(Continued)

OTHER PUBLICATIONS

Festa and Borland, "Netscape alumni to launch P2P company", Aug. 2, 2001, (available at http://news.cnet.com/news/0-1005-202-6766377.html).

(Continued)

*Primary Examiner*—Robert B Harrell
(74) *Attorney, Agent, or Firm*—Fitch, Even, Tabin and Flannery

(57) ABSTRACT

A network application operates in a multi-user environment and in various network communication configurations. The application controls the selection of communication ports and associated communication protocols for a network computer that is participating in an online session of the multi-user application. A network computer running the application opens multiple communication ports through which the application can send communication signals to other network computers that are participating in the online session. The network computer then associates each of the opened communication ports with a communication protocol, such that communication signals that the application sends and receives will conform to the protocol of the communication port. The network computer then designates an active communication port through which the application will send and receive communication signals for the first computer. The network computer then sends a communication signal to the other network computers participating in the online session identifying the active communication port and the associated protocol for the first computer.

23 Claims, 11 Drawing Sheets

U.S. PATENT DOCUMENTS

| | | | |
|---|---|---|---|
| 5,704,032 | A | 12/1997 | Badovinatz et al. |
| 5,838,909 | A | 11/1998 | Roy et al. |
| 5,841,980 | A | 11/1998 | Waters et al. ........... 395/200.34 |
| 5,893,106 | A | 4/1999 | Brobst et al. ................. 707/102 |
| 5,956,485 | A | 9/1999 | Perlman |
| 5,984,787 | A | 11/1999 | Redpath |
| 5,987,376 | A | 11/1999 | Olson et al. |
| 6,003,075 | A | 12/1999 | Arendt et al. ................. 709/221 |
| 6,041,312 | A | 3/2000 | Bickerton et al. .............. 705/30 |
| 6,152,824 | A | 11/2000 | Rothschild et al. |
| 6,219,045 | B1 | 4/2001 | Leahy et al. ................. 345/331 |
| 6,311,209 | B1 | 10/2001 | Olson et al. |
| 6,360,331 | B2 | 3/2002 | Vert et al. |
| 6,463,078 | B1 | 10/2002 | Engstrom et al. |
| 6,487,678 | B1 | 11/2002 | Briskey et al. |
| 6,560,636 | B2 | 5/2003 | Cohen et al. |
| 6,561,811 | B2 | 5/2003 | Rapoza et al. |
| 6,607,444 | B2 | 8/2003 | Takahashi et al. |
| 6,631,412 | B1 | 10/2003 | Glasser et al. |
| 6,676,521 | B1 | 1/2004 | La Mura et al. |
| 6,748,420 | B1 | 6/2004 | Quatrano et al. |
| 6,761,636 | B2 | 7/2004 | Chung et al. |
| 6,826,523 | B1 | 11/2004 | Guy et al. |
| 6,931,446 | B1 | 8/2005 | Cox et al. |
| 7,003,550 | B1 | 2/2006 | Cleasby et al. |
| 7,018,295 | B2 | 3/2006 | Sakaguchi et al. |
| 7,056,217 | B1 | 6/2006 | Pelkey et al. |
| 7,107,312 | B2 | 9/2006 | Hackbarth et al. |
| 7,337,210 | B2 | 2/2008 | Barsness |
| 2001/0044339 | A1 | 11/2001 | Cordero et al. |
| 2002/0035604 | A1 | 3/2002 | Cohen et al. |
| 2002/0049086 | A1 | 4/2002 | Otsu |
| 2002/0055989 | A1 | 5/2002 | Stringer-Calvert et al. .. 709/220 |
| 2002/0062348 | A1 | 5/2002 | Maehiro |
| 2002/0133707 | A1 | 9/2002 | Newcombe |
| 2002/0184349 | A1 | 12/2002 | Manukyan ................. 709/220 |
| 2003/0073494 | A1 | 4/2003 | Kalpakian et al. |
| 2003/0204566 | A1 | 10/2003 | Dhupelia et al. |
| 2003/0217135 | A1 | 11/2003 | Chatani |
| 2003/0217158 | A1 | 11/2003 | Datta |
| 2006/0100020 | A1 | 5/2006 | Kasai |

FOREIGN PATENT DOCUMENTS

| | | |
|---|---|---|
| WO | WO 00/05854 | 2/2000 |
| WO | WO 01/82678 | 11/2001 |
| WO | WO 02/35769 | 5/2002 |

OTHER PUBLICATIONS

Uno, Toshio; The PC Technology; Understanding the Profoundness of Technology; A new usage of the Internet; Dispersed Processing Technology: "Peer to Peer"; Nikkei Win PC, the 8th volume, 5th issue, pp. 120-122, 224, Nikkei Business Publications, Inc., Japan (May 1, 2002).

'Search for the Mosaic of the 21st Century; Internet Next Applications; No. 6, The Platform of P2P application using Jini nebula', Internet Magazine, No. 78 pp. 324-325, Impress Corporation, Japan (Jul. 1, 2001).

Shimazu, Tadasugu; 'A stream of the new business of the Napster P2P Model shaking the Internet', Nikkei Communications, the 324th issue, pp. 88, 201, Nikkei Business Publications, Inc., Japan (Aug. 21, 2000).

Introduction to LAN-programming Part 3: The Review of the PC LAN, LAN Manager Microsoft Co., Ltd, Quick-Net Minato-Electronics, Co., Ltd, C-Magazine, the 3rd volume, the 8th issue, pp. 73-80, Softbank, Co., Ltd, Japan (Aug. 1, 1991).

Japanese Patent Office; "Notification of Reasons for Refusal"; Dispatch Date: Nov. 7, 2006; pp. 1-6.

Patent Cooperation Treaty; "Notification of Transmission of International Search Report" for corresponding International App. No. PCT/US03/08681; Date of Mailing: Jun. 24, 2003; p. 1.

Patent Cooperation Treaty; "International Search Report" for corresponding International App. No. PCT/US03/08681; Date of Mailing: Jun. 24, 2003; pp. 1-3.

Patent Cooperation Treaty; "Notification of Transmittal of International Preliminary Examination Report" for corresponding International App. No. PCT/US03/08681; Date of Mailing: Sep. 22, 2003; p. 1.

Patent Cooperation Treaty; "International Preliminary Examination Report" for corresponding International App. No. PCT/US03/08681; Date of Mailing: Sep. 22, 2003; pp. 1-3.

The Patent Office of the People's Republic of China; "Notification of the First Office Action" for corresponding Chinese Patent App. No. 03800848.3; Date of Notification: Jan. 26, 2007; 5 pages, including English language Text of the First Office Action.

Taiwan Patent Office; "Official Letter" for corresponding Taiwanese Patent App. No. 92106476; Dated Jul. 27, 2004; pp. 1-2.

Korean Intellectual Propery Office; "Notice of Preliminary Rejection" for corresponding Korean Patent App. No. 10-2004-7007027; Dated Mar. 31, 2006; 3 pages including English language translation.

The Patent Office of the People's Republic of China; "Rejection Decision;" for corresponding Chinese Application No. 03800848.3; Dated Jul. 13, 2007; 9 pages.

Cope, James; "Peer-to-Peer Network"; ComputerWorld, Apr. 8, 2002; pp. 52.

Diot et al.; "A Distributed Architecture for Multiplayer Interactive Applications on the Internet"; IEEE vol. 13, Issue 4, Aug. 4, 1999; 17 pages.

Cisco Systems, Inc.; "Network Flow Management: Resource Reservation for Multimedia Flows"; Mar. 19, 1999; 10 pages.

European Patent Office; "Supplementary European Search Report" issued in corresponding European Patent Application No. 03719439.6-2413; mailed Oct. 10, 2008; 3 pages.

Steven Hessing; "Peer to Peer Messaging Protocol (PPMP); draft-hessing-p2p-messaging-00.txt"; IETF Standard-Working-Draft, Internet Engineering Task Force, IETF, CH; Apr. 1, 2002; XP015001173; pp. 1-57.

TABLE 500

| Index | Session Master | Active Port/Protocol Type |
|---|---|---|
| 1 | Owns C1 | 80/TCP, 90/UDP |
| 2 | Owns C2, C3 | 85/TCP, 95/UDP |
| 3 | - | |
| - | - | |
| - | - | |
| - | - | |

Figure 5

METHOD AND APPARATUS FOR CONTROLLING COMMUNICATION PORTS FOR AN ONLINE SESSION OF A MULTI-USER APPLICATION BY ASSOCIATING EACH OF THE PORTS WITH A PROTOCOL AND DESIGNATING AN ACTIVE PORT

REFERENCE TO PRIORITY DOCUMENT

This application claims priority of co-pending U.S. Provisional Patent Application Serial No. 60/381,758 entitled "Configuration Control by Automatic Communication Port Selection and Switching Configuration by Switching Communication Port", by Glen Van Datta and Adam Harris, filed May 17, 2002. Priority of the filing date of May 17, 2002 is hereby claimed, and the disclosure of the Provisional Patent Application is hereby incorporated by reference.

BACKGROUND OF THE INVENTION

1. Field of the Invention

The present invention relates generally to computer networks and, more particularly, to a multi-user software application.

2. Description of the Related Art

Computer networks, such as local area networks and the Internet, are increasingly being used as the backbone for various transactions and interactions between parties. From online banking, where bank customers can initiate financial transactions on a computer network, to online gaming, where gamers can participate in various games over the Internet, service providers are increasingly providing a variety of services over computer networks. There are currently a variety of different computer network configurations that facilitate the transactions and interactions that take place.

One type of configuration is a classic client-server configuration, such as is illustrated in FIG. 1. In this configuration, a dedicated server computer 110 is communicatively linked to one or more client computers 120 over a network, such as through the Internet. The network is represented by the connecting arrows. The client computers 120 make service requests to the server computer 110 and the server computer 110 fulfills the requests by transmitting data to the requesting client computers 120 over the network. The server computer 110 can be connected to a data storage device or to other computer devices that facilitate transactions between the client and server computers. One characteristic of the client-server configuration is that the client computers cannot communicate directly with one another, as the client computers are limited to communicating with the server computer.

For example, where the client-server configuration is operated in an online gaming environment, the server computer 110 can be responsible for maintaining the various states that are associated with the online game. The server computer can be connected to other computers, such as a memory engine 140 that maintains one or more instances of a game, while the server computer 110 manages administrative matters such as player matching and account management. A game player on the client computer 120 can register with, or logon to, the server computer 110 and receive a list of available games and participating players. The player chooses a game to start or join, thereby identifying a memory engine with which the player's computer establishes a client-server connection. In this manner, the server computer 110 and the memory engine 140 collectively administer the gaming environment for one or more client computers 120.

Another type of configuration is referred to as an integrated server configuration, such as is shown in FIG. 2. This configuration includes a dedicated server computer 110 and one or more client computers 120 that are each connected to the server computer 110 over a computer network. As in the previously-described configuration, the server computer 110 serves data to the client computers 120. However, one of the client computers, such as the client computer 120a, functions as an integrated server in that the client computer 120a can serve data to the other client computers 120. In an online gaming environment, the server computer 110 can perform administrative functions, such as player matching, account management, and chat room management, while the client computer/integrated server 120a can perform the function of the previously-described memory engine. This reduces the computing resources that must otherwise be supplied by the game provider.

In yet another type of communication configuration, the various computers are arranged in a peer-to-peer configuration, such as is shown in FIG. 3. In a peer-to-peer network configuration, each of the computers can communicate with the others, so that all of the network computers function as "peers". In one form of the peer-to-peer configuration, a dedicated server 110 is communicatively connected to a plurality of client computers 120 over a network. An online session is initially established by each of the client computers 120 connecting to an administrative computer, such as the server computer 110. The client computers 120 are then communicatively connected to one another so that each of the client computers 120 has the ability to both serve and receive data to and from any of the other client computers 120. In addition, each client computer 120 can operate in a client-server relationship with the dedicated server 110. Those skilled in the art will appreciate that there are other communication configurations in addition to the configurations described above.

The various configurations described above enable computer users to interact over a computer network, such as in an online game environment where game players can play computer games over a computer network. In such a scenario, at least one of the computers typically functions as a game manager that manages various aspects of the game, such as coordinating the number of players, keeping track of game state, and sending out updates to the users regarding game state. If the computer that manages such aspects were to leave the online session, the gaming environment might suddenly vanish for the other participants of the game. This would immediately halt game play.

Typically, where a game manager computer leaves an online gaming session, it is necessary to re-configure the communication environment so that the remaining participants will communicate through the correct medium, such as through a different computer rather than through the game manager that exited the session. Unfortunately, the change can be cumbersome and disruptive to the gaming environment.

In view of the foregoing, there is a need for an online multi-user application that can successfully manage changes in the communication configuration between users.

SUMMARY

The present invention relates to a network application that operates in a multi-user environment and in various network communication configurations. The application controls the selection of communication ports and associated communication protocols for a network computer that is participating in an online session of the multi-user application. During an online session of the application, when the application is executing on a network computer, the application opens multiple communication ports of the computer, through which the application can send communication signals to other computers that are participating in the online session. The application at the network computer then associates each of the opened communication ports with a communication protocol, such that communication signals that the application sends and receives will conform to the associated protocol of the communication port. The network application then designates an active communication port through which communication signals will be sent and received. A communication signal is sent by the application at the network computer to the other computers participating in the online session, identifying the active communication port and the associated protocol for the network computer.

During the online session, the network computer can receive a configuration change message from another computer participating in the online session. If the configuration change message indicates that a communication configuration of the online session has changed, the network computer responds to the configuration change by designating a new active communication port based upon the newly received communication configuration of the online session. The network computer can also determine when such a change is appropriate and can initiate the configuration change.

Other features and advantages of the present invention should be apparent from the following description of the preferred embodiment, which illustrates, by way of example, the principles of the invention.

BRIEF DESCRIPTION OF THE DRAWINGS

FIG. 5 is an illustration of a data structure that includes computer index and session master information for the multi-user application configured as shown in FIG. 4.

DETAILED DESCRIPTION

Figure 4:
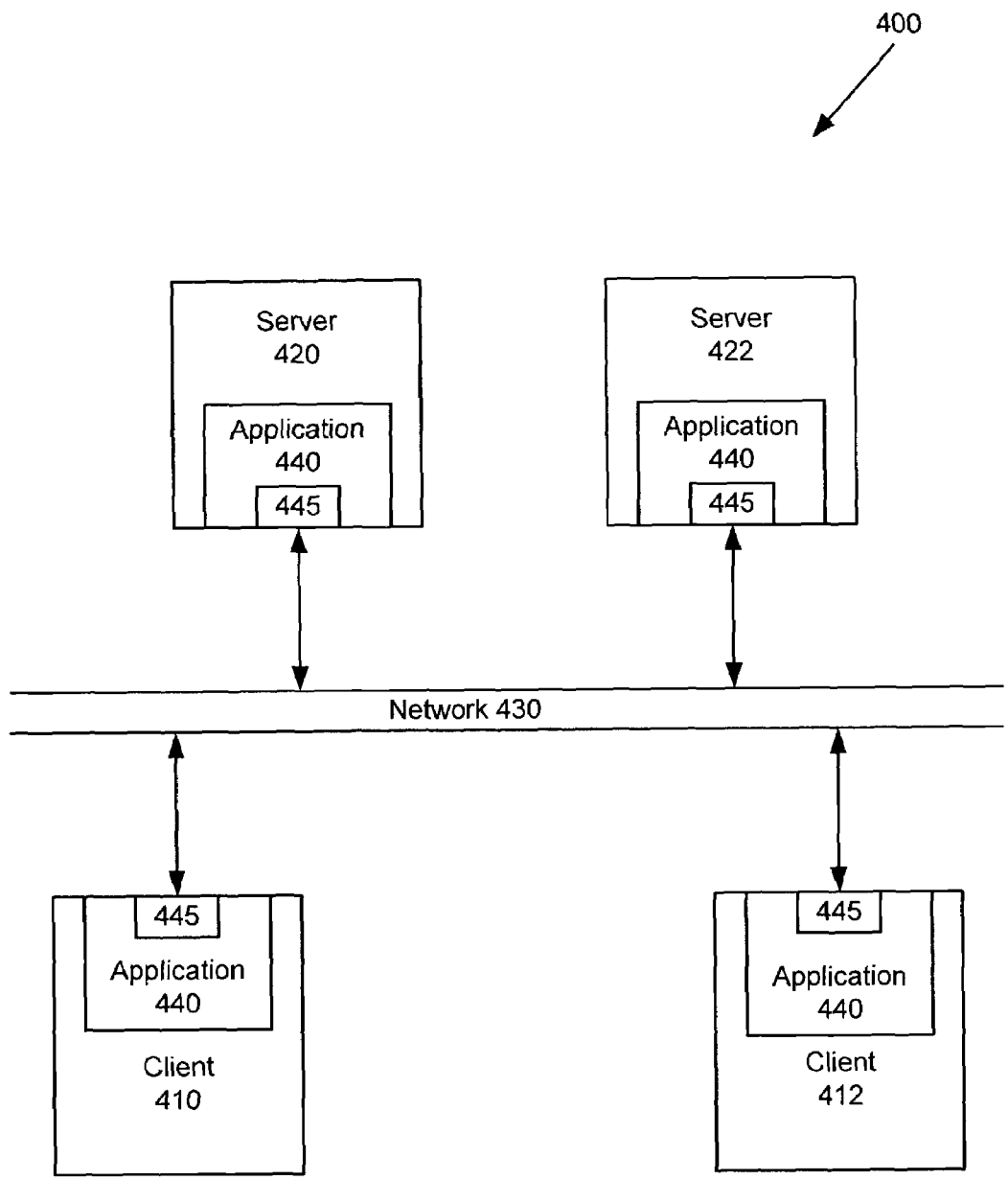
FIG. 4 is an illustration of a computer network system on which is run a multi-user application configured in accordance with the present invention.

FIG. 4 is a block diagram of a computer network system 400 comprised of one or more network devices including one or more client computers 410, 412 and one or more dedicated server computers 420, 422, which are nodes of a computer network 430. Thus, some of the network computers are configured as servers and some are configured as clients. The computer network 430 may comprise a collection of interconnected networks, such as the Internet, and may include one or more local area networks at each of the nodes 410, 412, 420, 422. As used herein, the term "Internet" refers to a collection of interconnected (public and/or private) networks that are linked together by a set of standard communication protocols to form a global, distributed network.

The client computers 410, 412 can transmit requests for data over the network 430 to one of the server computers 420, 422, which are configured to serve data over the network 430 to the client computers in a well-known manner. The server computers 420, 422 can include or can be communicatively linked to each other and to other servers, such as a data base server and/or an application server, as will be known to those skilled in the art. Although FIG. 4 shows only two client computers 410, 412 and two server computers 420, 422, it should be appreciated that the network system 400 could include any number of client computers 410, 412 and server computers 420, 422. The server computers 420, 422 and client computers 410, 412 are sometimes referred to collectively herein as network computers.

The network system 400 supports a multi-user application 440 comprised of a computer program with which multiple users can interact in online sessions using network devices (such as the client computers 410, 412) that are linked to the computer network 430. The application 440 is installed at each of the client computers, meaning that an operational instance of the application is stored in memory of each of the client computers 410, 412 that run (execute) the application 440. Each server computer that will be participating in an online session of the multi-user application also stores an instance of the application 440. For purposes of this description, the first server computer 420 will be assumed to be a server for the multi-user application being executed by the client machines 410, 412, although both servers 420, 422 are shown with installed applications 440. An exchange of data occurs between instances of the application 440 during execution and is enabled through the establishment of network sockets 445 at each of the network computers. The sockets are represented in FIG. 4 as boxes at each respective network computer. Those skilled in the art will understand that a network socket is one end of a multi-way communication link between two or more programs that run on the network system 400.

Figure 1:
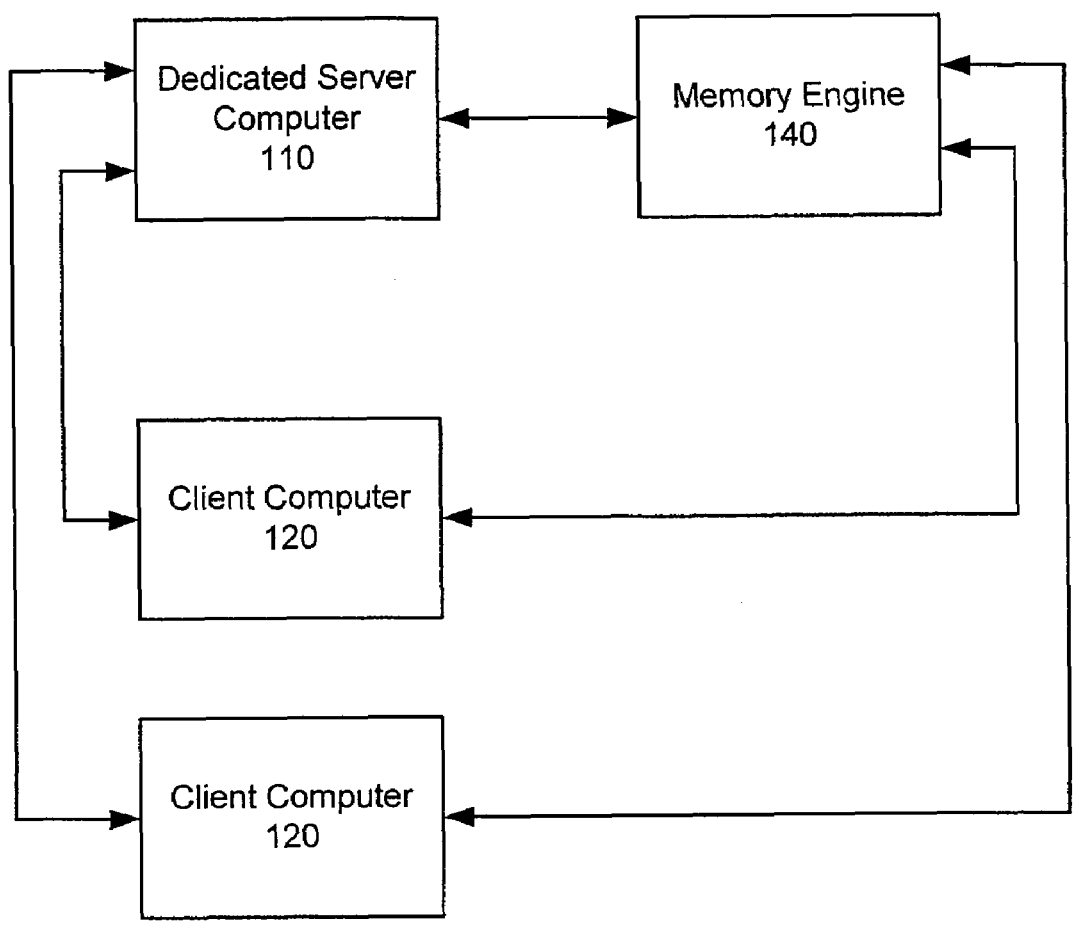
FIG. 1 is an illustration of a computer network arranged in a client-server network communication configuration.
Figure 2:
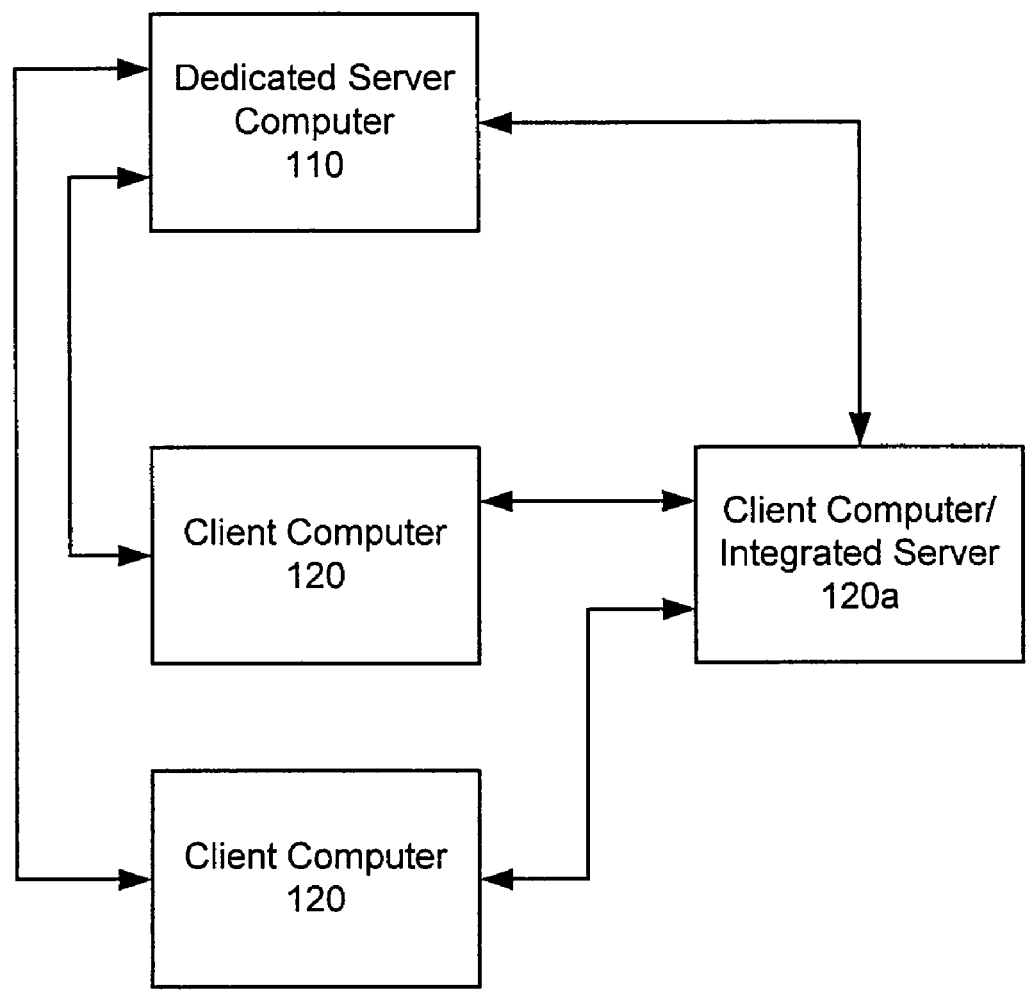
FIG. 2 is an illustration of a computer network arranged in an integrated network communication server configuration.
Figure 3:
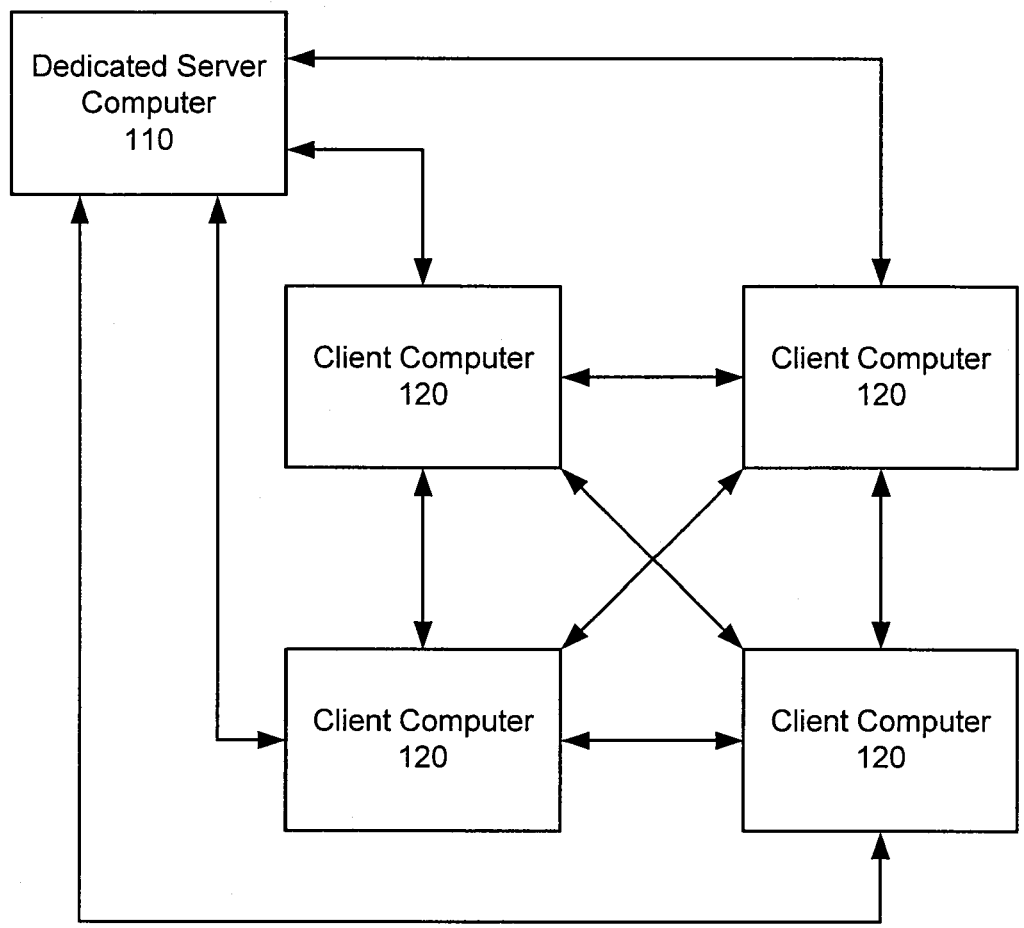
FIG. 3 is an illustration of a computer network arranged in a peer-to-peer network communication configuration.

The application 440 can be run on the network devices of the network system 400 according to a variety of communication configurations and the responsibilities for various application-related processes can be assigned to different computing devices of the network 430, as described in more detail below. An application development interface is preferably used to develop the application 440, as is also described in more detail below. The application can be operated such that the associated network computer can use a communications configuration to implement any of the communication modes illustrated in FIG. 1, FIG. 2, and FIG. 3.

The multi-user application 440 can be any type of application that a user can run on a network computer that is linked to the computer network 430. When the application 440 is run on a client computer 410, 412, the user can interact with other users through other network computers that are also running the application 440. The server computer 420 can function as a central network "meeting point" through which the users can establish contact, maintain data, and initiate an online session of the application 440. Typically, the application 440 causes the network device in which it is operating to establish communications with another network device, such as the devices 410, 412, 420, thereby initiating an online session. During the online session, the network computers will interact and exchange data pursuant to the programmed features of the application 440.

When the application 440 is launched and an online session is established among suitably configured computers, the application enables the computers to interact in a variety of configurations. Throughout this description, the application 440 is sometimes described in an online-gaming scenario, wherein the application 440 comprises a computer game that multiple users can access and run using the client computers 410, 412. In such a case, the application 440 establishes an online session comprised of a game in which the network computers participate. However, the application 440 can also relate to other scenarios besides gaming, such as, for example, online banking or online travel planning, that involve interactions between multiple computers on a computer network.

When an application 440 executes, it identifies a session master, which is a network computer that performs a variety of managerial and administrative functions for the application with respect to interactions between computers that occur during an online session. An online session of the application uses a registration or logon process with a data store containing information such as user identification. The logon process authorizes further participation in the network environment of the application. Preferably, the session master function is assigned when a client computer running the application 440, such as the client computer 410, logs onto the server computer 420 to initiate an online session. The application itself, however, determines the details of when and how such assignments are made, so that a variety of session master assignment schemes can be implemented without departing from the teachings of the present invention.

The operating instance of the application on the client computer 410 that initiates an online session of the application is referred to as the host computer. The application at the host computer assigns the session master function to either the server computer 420 or to the host computer 410. As new client computers log-on (register) with the server computer 420 to join the online session, the server computer 420 notifies the new clients of the already-assigned identity of the session master computer.

As described more fully below, the session master functionality enables a smooth transition between the various network communication configurations in which the application 440 can operate. The session master function also enables the application 440 to concentrate responsibility for application-related tasks in a specific network computer, or to distribute such responsibility among two or more network computers. The assignment of tasks can be performed by an instance of the application 440 on one of the network computers, at the same time when the session master function is assigned, and the session master tasks can be assigned to one or more of the computers on the network 430 for providing the requisite functionality. The computer or computers that are assigned responsibility of the session master are referred to herein as the "owners" of the respective session master functions. References to a solitary session master will be understood to apply to a group of computers, if those computers are collectively performing the session master functions. Thus, the assignment of session master tasks is performed in the manner specified by the application, in accordance with the dictates of the application developer.

One category of responsibilities assigned to the session master relates to application-specific functions, which are functions that are peculiar to the particular type of application 440 being executed. For example, if the application 440 is a game-type application, then the session master or a group of session masters can keep track of game-type data, such as the game score and the time remaining in the game, and can perform game functions, such as terminating the online session when a game ends. A session master computer can also be assigned the responsibility of keeping track of specific game data, such as the state of an object in the game environment, such as a football, aircraft, ocean, tree, and so forth. Each of these responsibilities can be concentrated in a single session master computer or can be divided up among several session master computers, in accordance with the operation of the application.

The host computer performs managerial functions related to the computers that are participating in the online session. For example, whenever a network computer joins an online session of the application 440, the host computer assigns an identification index number to the computer joining the session. The host computer maintains a list of the identification index numbers and their associated network computers. The index number is used when sending messages and is also used to maintain ownership records regarding the session master functionality.

As noted above, there can be more than one session master in an online session. The way in which a session master is assigned can be determined by the application in accordance with the operation of the application. The application 440 can also assign the session master with responsibility for sending out update messages to update the network computers regarding the status of all network computers that are participating in the online session. This responsibility entails the session master notifying the participating network computers when a new network computer joins the online session, or when a current participant exits the online session of the application 440, as described more fully below.

The host computer that assigns the aforementioned index number to each of the computers also maintains a list of all network computers that are participating in the online session. The application 440 then keeps track of session master ownership according to the index number assigned to the computer. To keep track of the index number and responsibility assignments, the application 440 can maintain a data structure such as in the form of a table comprised of a network computer index list, such as the table 500 shown in FIG. 5. The table 500 contains an index number associated with each network computer that is participating in the online session, and also contains an indication of whether the network computer owns the session master function. The index list data structure comprising the table 500 preferably also specifies the communication protocol that is being used for each network computer. FIG. 5 shows that different session master tasks (C1, C2, C3) can be owned by different network computers.

In addition to specifying the communication protocol, the data structure also specifies, for each network computer, the port for which the communication protocol is associated. Each instance of the application 440 enables the associated network computer that is participating in the online session to open multiple communication ports, with each port being associated with a particular communication protocol. The network computers communicate with other network computers using a particular port and a particular protocol, which is specified in the data structure comprised of the table 500 shown in FIG. 5. The ports can comprise network sockets through which the instances of the application 440 communicate over the network. The network computers preferably communicate the port/protocol information, as well as the other information contained in the index list, by periodically sending communication messages to one another over the network.

Preferably, all of the computers that are participating in the online session keep their own copy of the table 500 index list. It should be appreciated that the table 500 is merely exemplary and that the initiating host application 440 could keep track of client index numbers and session master ownership in other manners using a wide variety of data structure formats. Alternatively, the session computers can share one or more copies of the table.

The initiating application 440 can operate in various communication configurations depending on how the application 440 assigns ownership of the session master. In a first configuration, shown in FIG. 6, the initiating application 440 has assigned ownership of a session master 600 to a single computer, such as the dedicated server computer 420. Therefore, this computer 420 has responsibility for all of the tasks associated with the session master function as dictated by the initiating application 440. Thus, the application 440 operates in a client-server communication configuration with respect to the functions of the session master, with the server computer 420 serving data to the client computers 410 relating to the session master responsibilities.

Figure 6:
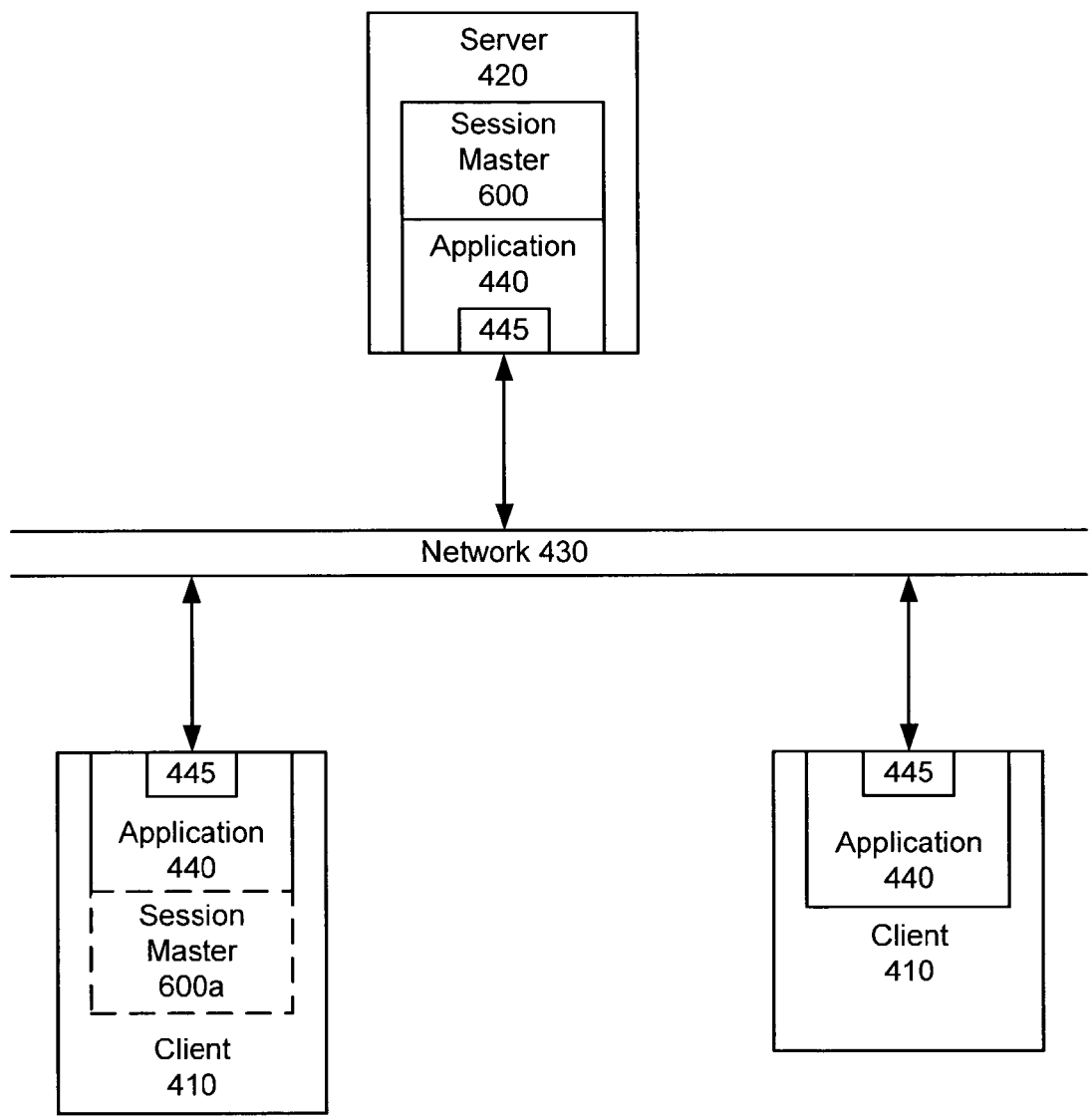
FIG. 6 is an illustration of a computer network system wherein the multi-user application is arranged in a first type of communication configuration where server computer or a client computer is designated as a session master.

It should be appreciated that any of the computers that are participating in the online session of the application 440 could have ownership of one or more of the session master tasks, such as where one of the client computers 410 is shown owning a session master 600a, which is shown in FIG. 6 using phantom lines. This indicates that the client computer has been assigned and is performing one or more session master tasks, along with or in place of the nominal session master server computer 420. That is, there can be several instances of a session master among the computers participating in an online session, with each instance of a session master being assigned specific responsibilities and each session master task being assigned to a different network computer, or multiple tasks being assigned to the same computer. For example, FIG. 6 shows a situation where there are two session masters 600 and 600a, each being assigned responsibility for certain functionality relating to the online session of the application 440. The server computer 420 has certain responsibilities and the client computer 410 also has certain responsibilities, as determined by the application. This is an integrated server configuration, where the client computer 410 that owns the session master 600a is functioning as an integrated server. An "integrated server" refers to a situation in which all clients send information to a client that is designated as an integrated server, and where that integrated server propagates the information to the other clients. The client acting as the integrated server can also own one or more session master tasks.

Figure 7:
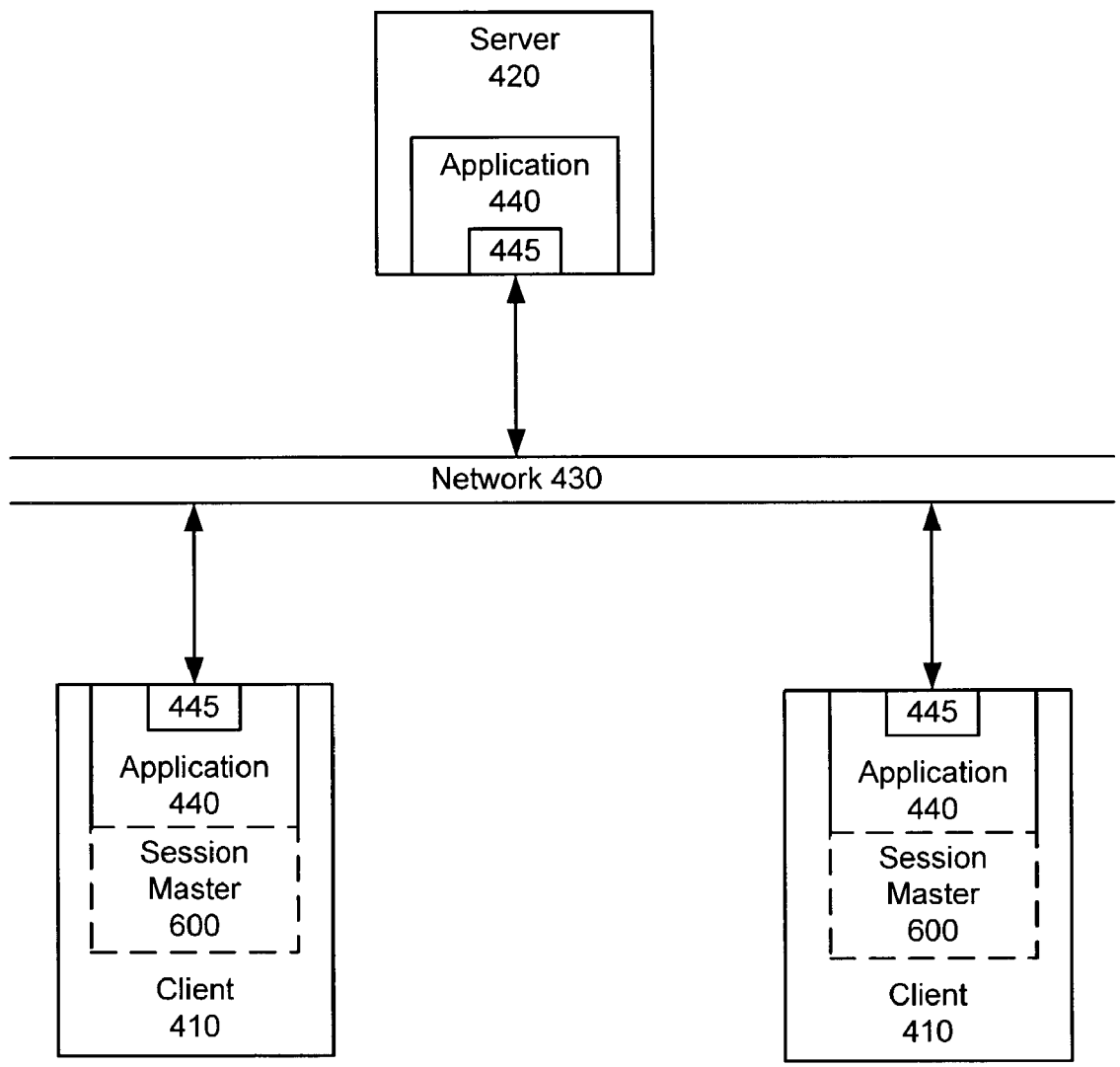
FIG. 7 is an illustration of a computer network system wherein the multi-user application is arranged in another type of communication configuration where multiple client computers are designated as session masters.

In another scheme, shown in FIG. 7, the application 440 has distributed ownership of the session master 600 among several computers. In the illustrated example, both of the client computers 410 share ownership of the session master 600. In such a case, both of the computers could perform the functions associated with the session master so that the network computers in FIG. 7 are in a peer-to-peer configuration.

Each of the network computers preferably establishes a communication port for sending and receiving communication signals pursuant to the online session of the application 440. A communication port is one end of a logical connection that is established with another network computer in the online session. Each of the network computers designates a communication protocol for each communication port. The network computers can switch ports, and the corresponding communication protocol, based upon the communication configuration of the online session.

Figure 8:
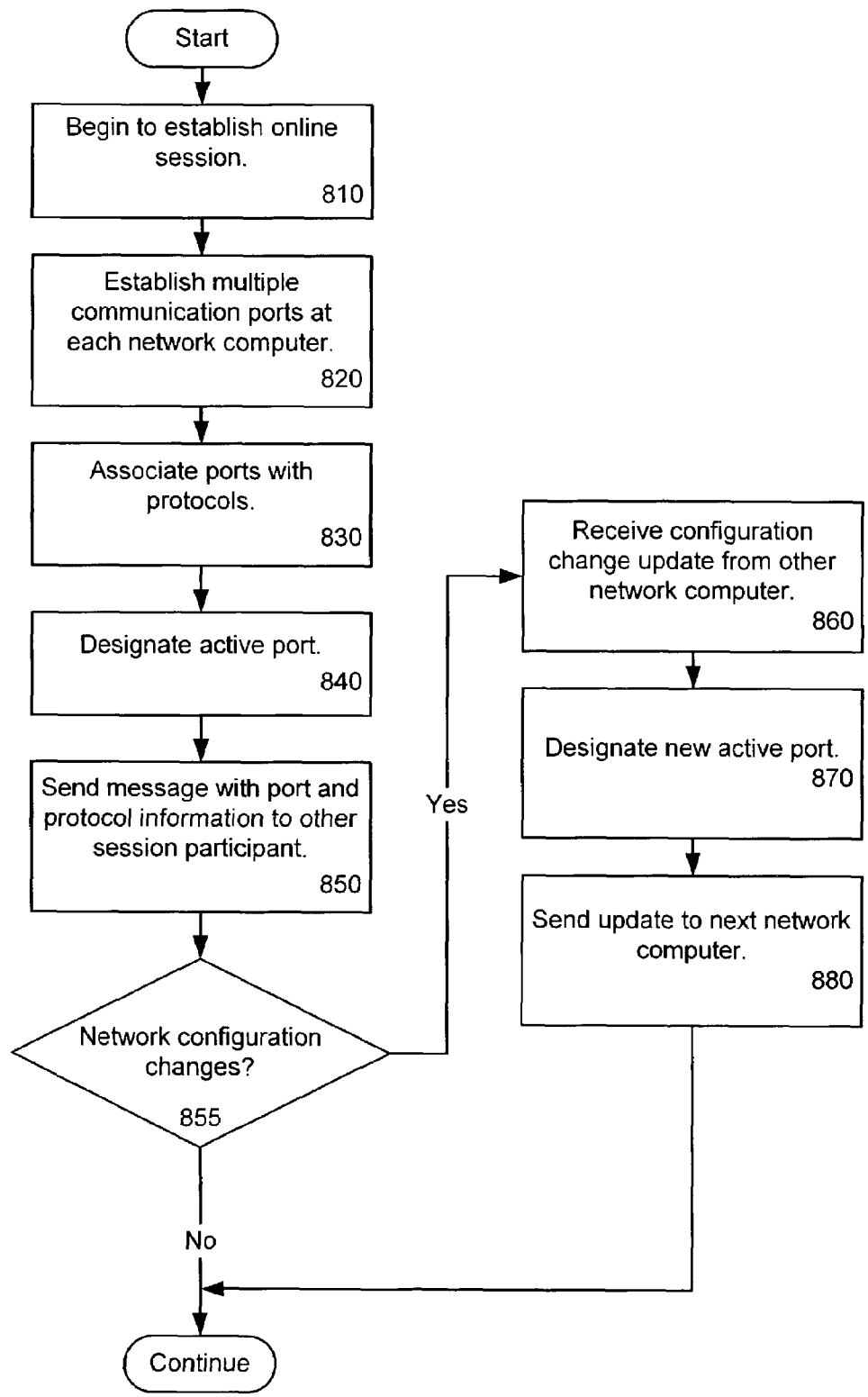
FIG. 8 is a flow diagram that represents a process of managing the exiting of a participant in an online session of a multi-user application.

This process is described in more detail with reference to the flow diagram shown in FIG. 8, which describes a process of switching communication ports when the communication configuration of the online session changes. In the first operation, represented by the flow diagram box numbered 810, the network computers commence establishment of an online session of the application 440. This can be accomplished at a particular network computer by running the application 440 on the computer, which causes the particular network computer to connect to the server computer 420 in a well-known fashion. As mentioned, the server computer 420 thereby acts as a central network meeting point for the establishment of online sessions by network computers.

One of the network computers, such as the first computer to connect to the server computer 420, will act as a session master for the online session. Furthermore, when the first computer connects to the server computer and establishes the online session, the instance of the application 440 on that computer preferably assigns itself an initial index number, such as, for example, an index number of one or zero. It should be appreciated that the initial index number can vary and is not necessarily one or zero, depending on the design of the application. The server computer 420 and/or the computer that established the session then creates an index table 500, such as shown in FIG. 5, in order to keep a record of the index information. The table 500 is stored at the server computer and at the session master computer during establishment of the online session. Subsequent network computers to log on will then receive the next available index, as assigned by the server computer 420. The operations associated with establishment of the online session continue in the operations represented by the flow diagram boxes 820-850.

In the next operation, each of the network computers that is running the application 440 opens multiple communication ports through which the application 440 can send communication messages during the online session. This operation is represented by the flow diagram box numbered 820. The application 440 uses one of the communication ports to send and receive communication messages.

In the next operation, represented by the flow diagram box numbered 830, the application 440 associates each of the communication ports with a particular communication protocol. This is performed by the instance of the application 440 at each network computer. For example, on a particular network computer, the application 440 can associate one of the communication ports with the user datagram protocol (UDP) and another of the communication ports with the transmission control protocol (TCP), and so forth. Some protocols are more suited for use in certain communication configurations, and therefore the application 440 can be programmed so that it selects a protocol that is suited for a certain configuration. For example, in some cases, the TCP protocol can be more suited for the client-server communication configuration and the UDP protocol can be more suited for the peer-to-peer communication configuration. Each installation of the application 440 at a network computer preferably includes a library of specifications for protocol/port associations. When an instance of the application is executing, it consults the library for the appropriate protocol/port associations in view of the communication configuration.

In the next operation, the network computer designates one of the associated communication ports as an active port through which the network computer will send and receive communications for the online session. This operation is represented by the flow diagram box numbered 840. In designating the active port, the network computer preferably determines which port would provide the most efficient use of bandwidth and would provide the best control of latency. In this regard, the network computer considers the current communication configuration and the protocol that would be best suited for that configuration. The network computer then designates the port associated with the best-suited protocol as the active port.

The next operation is represented by the flow diagram box numbered 850. In this operation, one of the network computers transmits a communication message that contains the port and protocol information for that computer. The session participant who sends the message is determined by the application design. For example, the sending computer can be the session master or the computer that owns the corresponding session master task, or can be determined by an arbitration scheme of the clients, or can be the host application. The sending computer can automatically send the communication message as part of the establishment of the online session. The message preferably contains information that identifies the network computer as well as data regarding the computer, including the network computer index number, the port being used, and the protocol associated with the port. The data is preferably embedded in sequence within the message, so that, for example, the computer index is listed first, followed sequentially by the active port for that computer, and the protocol associated with the active port.

The message is preferably sent in a manner that avoids conflicts between multiple network computers sending out the message with the port and protocol information. In this regard, the computer with the lowest index number (which might be the session master computer) originates the message by sending the message to the computer associated with the next highest index number. The session master obtains the index numbers by accessing the index table 500. When the next computer receives the message, it adds its own data and then forwards the message to a next computer. That is, as each computer sends out the message, it appends its own port/protocol data to the data already contained in the message. In this manner, the last computer to receive the message has the port/protocol data for all computers participating in the online session. The message can then be cycled through the network computers that are participating in the online session so that all of the computers are provided with the updated information.

Each network computer maintains in local memory a data structure comprising an array of data that contains the port and protocol for each of the network computers in the session. The network computer can establish and update the array when it receives a port/protocol message.

The next operation depends on whether the online session undergoes a change in the communication configuration, such as where the online session switches from a peer-to-peer communication configuration to a client-server communication configuration, as represented by the decision box numbered 855. If no change in the communication configuration has occurred, a "No" result from the decision box 855, then the network computers continue to operate without any change with respect to the communication ports.

However, when a change in the communication configuration of the online session is specified in the communication message, a "Yes" result from the decision box 855, then one of the network computers, such as the session master computer, notifies the other participants of the online session that the communication configuration has changed or that it is going to change. The notification is in the form of a configuration change update message that the computer, such as the session master computer, sends to one or more of the online session participants. The configuration change update message identifies the new communication configuration, such as by specifying a code that is associated with a particular configuration.

In one embodiment, the configuration change update message originates from the session master computer, which sends the configuration change update to a first network computer, such as the network computer with an index number that is one higher than the index number of the session master computer. The receiving computer then directs that message to the next computer in the index numbering scheme, and the process continues. This assures an orderly notification of the configuration change to all the participants of the online session. Other notification schemes can be used for notifying the participants of the configuration change.

The process then proceeds to the operation represented by the flow diagram box numbered 860. In this operation, a network computer receives the configuration change update message from one of the other network computers. The first network computer to receive the configuration change update message receives it from the session master computer. When a network computer receives the configuration change update message, it then designates a new active port with a protocol that is suited for the new communication configuration specified by the message, as represented by the flow diagram box numbered 870. Each network computer can select the new active port through the instance of the application 440 on the network computer, or the session master can specify to the other computers the port that should be designated as active. The application 440 can automatically cause the network computer to switch to a particular transport protocol based on the particular communication configuration that is identified in the configuration change update message, and therefore will switch to the corresponding communication port. For example, if the new configuration is a peer-to-peer configuration, then the application can cause the network computer to automatically switch to the port that is associated with a particular protocol, such as, for example, UDP.

After the network computer designates a new active port, the process proceeds to the operation represented by the flow diagram box numbered 880. In this operation, the network computer sends one or more update messages to a "next" network computer that is participating in the online session according to some scheme for designating the next computer. The "next" computer can be the computer with the next largest computer index number after the computer index number of the current computer, although it should be appreciated that the index number need not be the basis for designating the "next" computer. For example, network logon time might determine a next computer, or some other scheme suited for the network configuration can be used. Whatever the definition being used for "next" computer, each network computer forwards the configuration change update message to the next computer to thereby notify the next computer that a communication configuration change has occurred.

The last network computer to receive the configuration change update message is aware that it is the last in the sequence of network computers, by virtue of the session establishment process of boxes 810 through 850, and then notifies the session master it has received the update message. This notification means that the configuration change update message has cycled through all of the network computers participating in the online session. The session master can then start a new cycle of messages with a message that includes the port and protocol information for the session master. This message is then cycled through the network computers until the port/protocol information has been updated for all of the participants of the online session.

The application 440 is preferably developed using a software development kit (SDK) that provides a library of object and communication message definitions that are used in the application 440. The software development kit includes an application interface through which applications that are developed using the SDK can run on a network system, such as the network system 400. The application interface of the SDK can reside in a central network server, such as the server 420, to which network computers that have the application 440 can log onto in order to operate an online session of the application. This permits careful testing of applications under development. By using the object and message types provided by the SDK, the application 440 can be developed to include the features described above. The SDK preferably includes an object definition structure that provides a client-based definition of objects that are utilized by the application 440. The object definition includes a plurality of characteristics associated with each object and utilized by the application to effect interaction with clients over the computer network.

Figure 9:
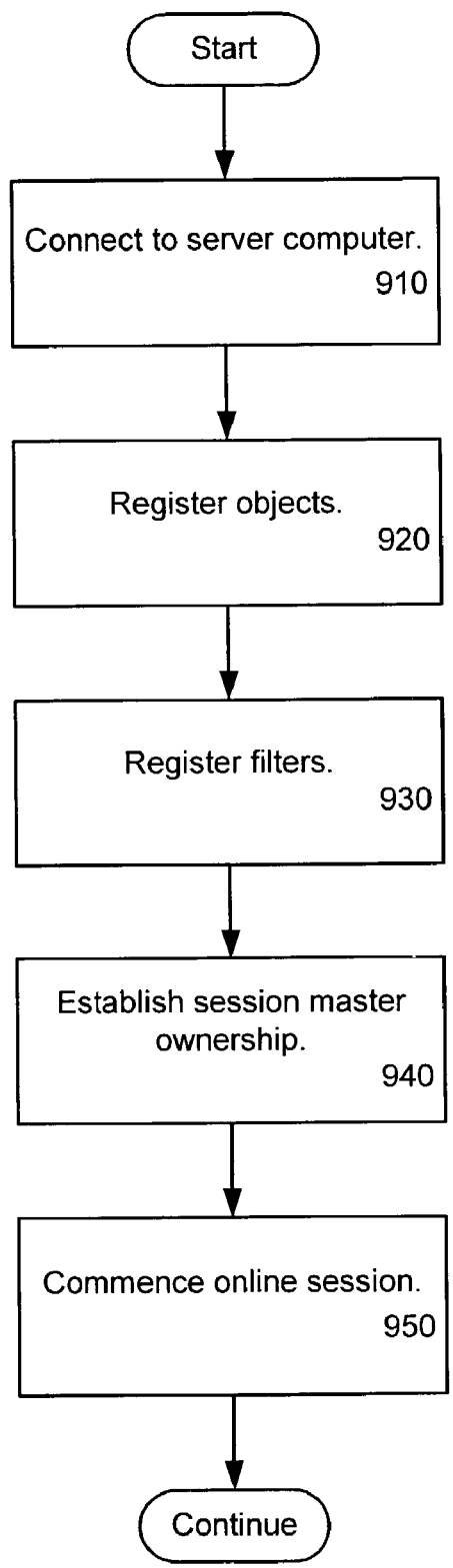
FIG. 9 is a flow diagram that illustrates the operating steps associated with the multi-user application establishing an online session.

Once the application 440 has been developed using the SDK, copies of the application can be produced and the application 440 can be loaded onto one or more network computers so that an online session can be established according to the operations shown in the flow diagram box of FIG. 9. In the first operation, represented by the flow diagram box numbered 910, a network computer on which the application 440 is loaded connects to a network computer that includes in memory that application interface software. For example, one or more of the client computers 410 of the network system 400 shown in FIG. 4 can have the application 440 loaded in memory and the server computer 420 can include the application interface. In such a case, the client computers 410 establish a communication connection with the server computer 410 over the network 430.

In the next operation, represented by the flow diagram box numbered 920, the application 440 registers objects according to the object definitions that are available in the library of the application interface. The application 440 also registers any message filters that will be utilized during the online session, as represented by the flow diagram box numbered 930.

In the next operation, represented by the flow diagram box numbered 940, the application 440 defines the session master and assigns ownership of the session master to one of the network computers. The ownership of the session master can be assigned to one computer or can be assigned to plural computers. The application 440 also specifies whether the ownership of the session master is dedicated to a particular computer or whether ownership can migrate to other computers.

During this operation, the application 440 assigns client indices to each of the network computers that will participate in the online session and also establishes the index table that was described above. The application 440 can be configured such that the first network computer to logon to the server computer will be the session master and also receive an initial index, such as an index of one or zero. Subsequent network computers to perform logon will then receive the next available index, in accordance with the definition of "next" being used for the system. After the ownership of the session master or session masters has been established, the online session of the application 440 is commenced, as represented by the flow diagram box numbered 950.

Figure 10:
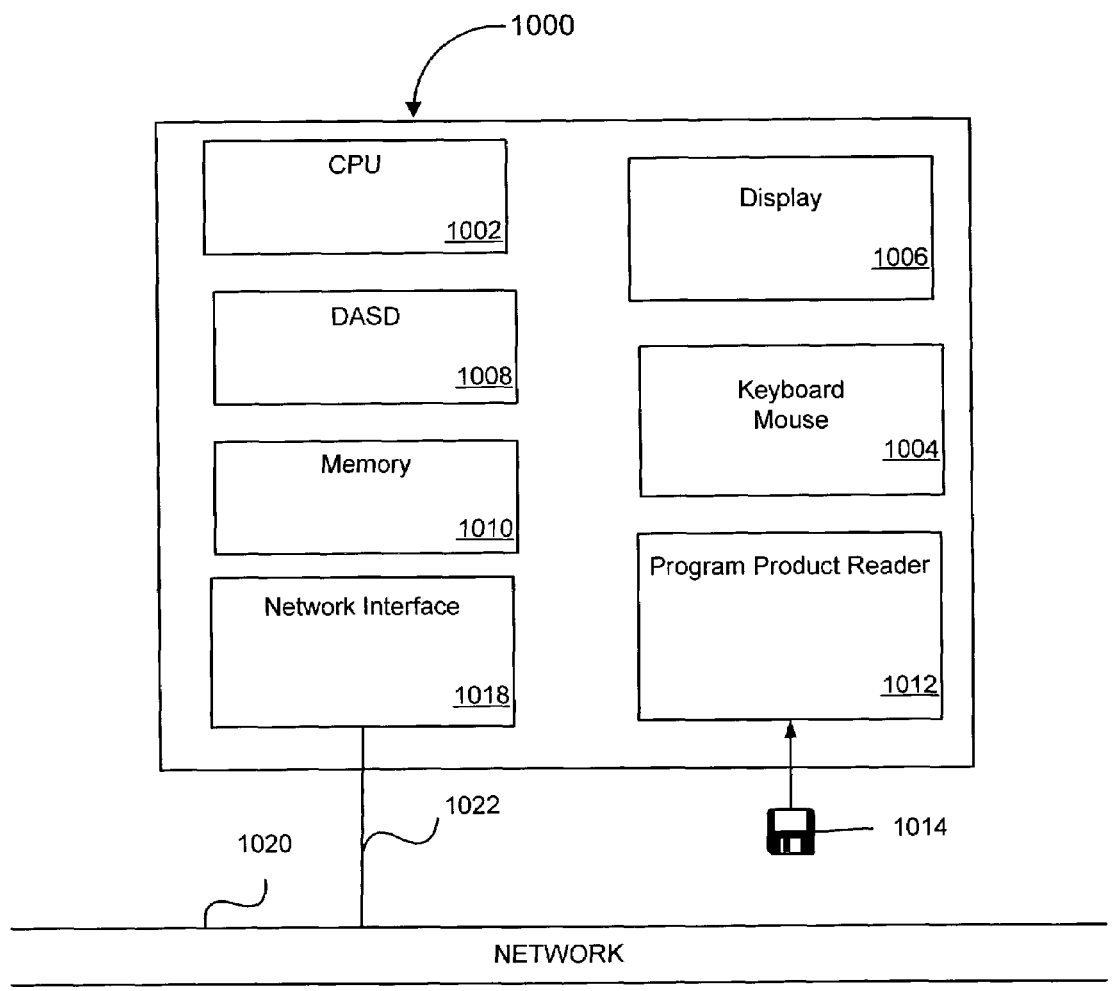
FIG. 10 is a block diagram of a computer in the network illustrated in FIG. 4, illustrating the hardware components.

As noted above, the network computers shown in the block diagram of FIG. 4 comprise nodes of a computer network system 400. FIG. 10 is a block diagram of a computer in the system 400 of FIG. 4, illustrating the hardware components included in one of the computers. Those skilled in the art will appreciate that the devices 410 and 420 can all have a similar computer construction, or can have alternative constructions consistent with the capabilities described herein.

FIG. 10 shows an exemplary computer 1000 such as might comprise any of the network computers. Each computer 1000 operates under control of a central processor unit (CPU) 1002, such as a "Pentium" microprocessor and associated integrated circuit chips, available from Intel Corporation of Santa Clara, Calif., USA. A computer user can input commands and data from a keyboard and computer mouse 1004, and can view inputs and computer output at a display 1006. The display is typically a video monitor or flat panel display. The computer 1000 also includes a direct access storage device (DASD) 1008, such as a hard disk drive. The memory 1010 typically comprises volatile semiconductor random access memory (RAM). Each computer preferably includes a program product reader 1012 that accepts a program product storage device 1014, from which the program product reader can read data (and to which it can optionally write data). The program product reader can comprise, for example, a disk drive, and the program product storage device can comprise removable storage media such as a magnetic floppy disk, a CD-R disc, a CD-RW disc, or DVD disc.

Each computer 1000 can communicate with the others over a computer network 1020 (such as the Internet or an intranet) through a network interface 1018 that enables communication over a connection 1022 between the network 1020 and the computer. The network interface 1018 typically comprises, for example, a Network Interface Card (NIC) or a modem that permits communications over a variety of networks.

The CPU 1002 operates under control of programming steps that are temporarily stored in the memory 1010 of the computer 1000. When the programming steps are executed, the computer performs its functions. Thus, the programming steps implement the functionality of the application 440. The programming steps can be received from the DASD 1008, through the program product storage device 1014, or through the network connection 1022. The program product storage drive 1012 can receive a program product 1014, read programming steps recorded thereon, and transfer the programming steps into the memory 1010 for execution by the CPU 1002. As noted above, the program product storage device can comprise any one of multiple removable media having recorded computer-readable instructions, including magnetic floppy disks and CD-ROM storage discs. Other suitable program product storage devices can include magnetic tape and semiconductor memory chips. In this way, the processing steps necessary for operation in accordance with the invention can be embodied on a program product.

Alternatively, the program steps can be received into the operating memory 1010 over the network 1020. In the network method, the computer receives data including program steps into the memory 1010 through the network interface 1018 after network communication has been established over the network connection 1022 by well-known methods that will be understood by those skilled in the art without further explanation. The program steps are then executed by the CPU 1002 thereby comprising a computer process.

It should be understood that all of the network computers of the network system 400 illustrated in FIG. 4 can have a construction similar to that shown in FIG. 10, so that details described with respect to the FIG. 10 computer 1000 will be understood to apply to all computers of the system 400. It should be appreciated that any of the network computers can have an alternative construction, so long as the computer can communicate with the other computers illustrated in FIG. 4 and can support the functionality described herein.

Figure 11:
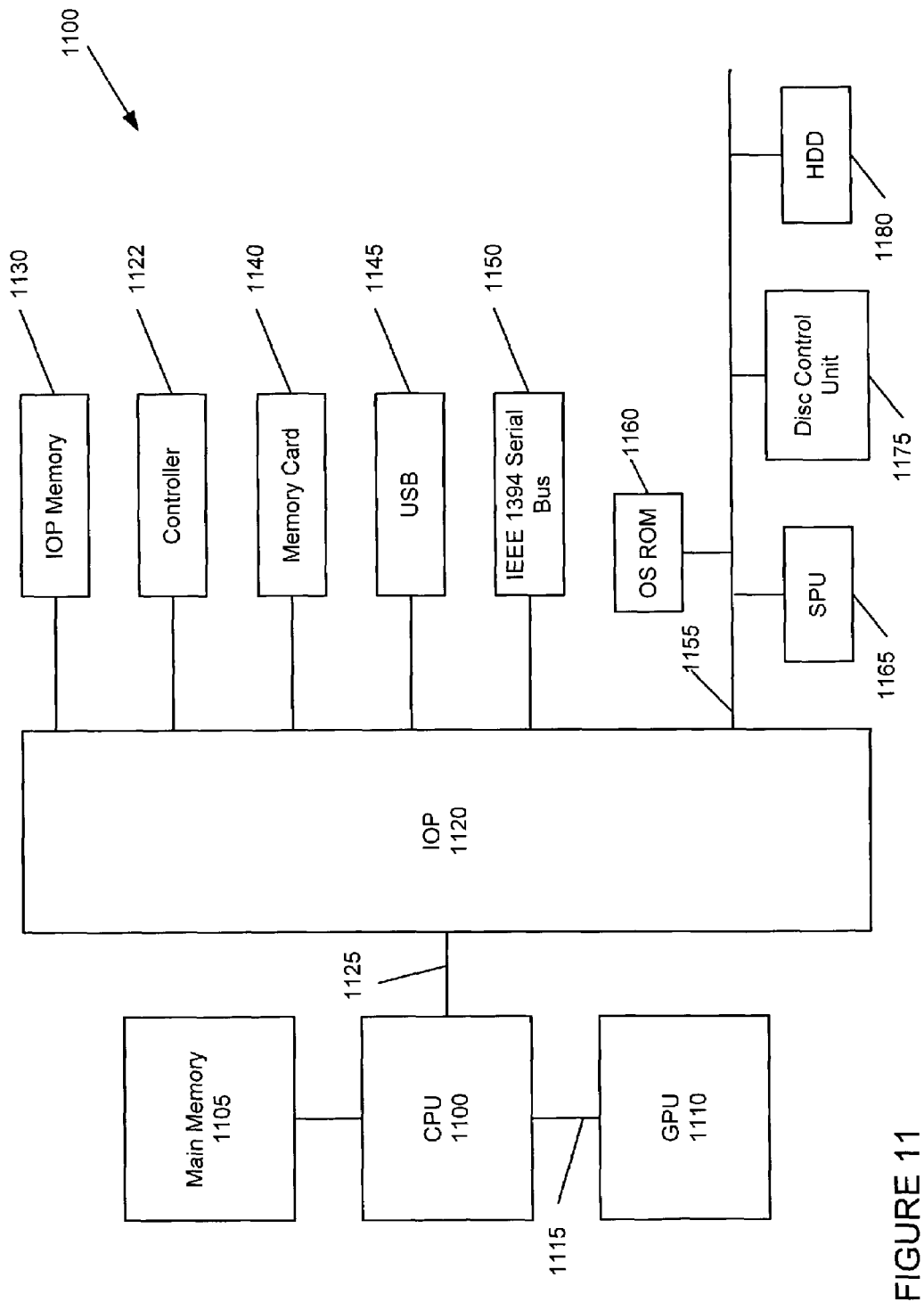
FIG. 11 is a block diagram of a computer entertainment system in the network illustrated in FIG. 4, illustrating the hardware components.

For example, with reference to FIG. 11, the client computers 420 can comprise a computer entertainment system, such as a video game system 1100. FIG. 11 is a block diagram of an exemplary hardware configuration of the video game system 1100.

The video game system 1100 includes a central processing unit (CPU) 1100 that is associated with a main memory 1105. The CPU 1100 operates under control of programming steps that are stored in the OS-ROM 1160 or transferred from a game program storage medium to the main memory 1105. The CPU 1100 is configured to process information and execute instructions in accordance with the programming steps.

The CPU 1100 is communicatively coupled to an input/output processor (IOP) 1120 via a dedicated bus 1125. The IOP 1120 couples the CPU 1100 to an OS ROM 1160 comprised of a non-volatile memory that stores program instructions, such as an operating system. The instructions are preferably transferred to the CPU via the IOP 1120 at start-up of the main unit 1100.

The CPU 1100 is communicatively coupled to a graphics processing unit (GPU) 1110 via a dedicated bus 1115. The GPU 1110 is a drawing processor that is configured to perform drawing processes and formulate images in accordance with instructions received from the CPU 1100. For example, the GPU 1110 can render a graphics image based on display lists that are generated by and received from the CPU 1100. The GPU can include a buffer for storing graphics data. The GPU 1110 outputs images to an audio-visual output device.

The IOP 1120 controls the exchange of data among the CPU 1100 and a plurality of peripheral components in accordance with instructions that are stored in an IOP memory 1130. The peripheral components can include one or more input controllers 1122, a memory card 1140, a USB 1145, and an IEEE 1394 serial bus 1150. Additionally, a bus 1155 is communicatively coupled to the IOP 1120. The bus 1155 is linked to several additional components, including the OS ROM 1160, a sound processor unit (SPU) 1165, an optical disc control unit 1175, and a hard disk drive (HDD) 1180.

The SPU 1165 is configured to generate sounds, such as music, sound effects, and voices, in accordance with commands received from the CPU 1100 and the IOP 1120. The SPU 1165 can include a sound buffer in which waveform data is stored. The SPU 1165 generates sound signals and transmits the signals to speakers.

The disc control unit 1175 is configured to control a program reader, which can comprise, for example, an optical disk drive that accepts removable storage media such as a magnetic floppy disk, an optical CD-ROM disc, a CD-R disc, a CD-RW disc, a DVD disk, or the like.

The memory card 1140 can comprise a storage medium to which the CPU 1100 can write and store data. Preferably, the memory card 1140 can be inserted and removed from the IOP 1120. A user can store or save data using the memory card 1140. In addition, the video game system 1100 is preferably provided with at least one hard disk drive (HDD) 1180 to which data can be written and stored.

A data I/O interface, such as an IEEE 1394 serial bus 1150 or a universal serial bus (USB) 1145 interface, is preferably communicatively coupled to the IOP 1120 in order to allow data to be transferred into and out of the video game system 1100, such as to the network 430 of FIG. 4.

Thus, the present invention provides a system and method for a computer network multi-user program environment that can alternate between an Integrated Server (IS) configuration using peer-to-peer communications and a dedicated application server configuration with client-server (e.g. TCP/IP) communications. Conventionally, when changing from IS to application server, the network user acting as the IS must change the operation of the game application so it will communicate with the other players through the application server. If this conversion operation is not performed, the application environment will suddenly vanish when the IS machine is logged off. A similar communications change will be necessary by all the other application users. The communications change involves all users switching their application operation from using a UDP communications port for peer-to-peer to using a TCP port for client-server operation. This change can be cumbersome, inconvenient, and disruptive to the gaming environment. The present invention provides a solution wherein a Configuration Control feature permits automatic switching of the multi-user application between the one port that is associated with a given communications configuration (such as a UDP port) and a second port that is associated with a different communications configuration (such as a TCP port). This permits continued operation of the application environment.

The present invention has been described above in terms of a presently preferred embodiment so that an understanding of the present invention can be conveyed. There are, however, many configurations for the system and application not specifically described herein but with which the present invention is applicable. The present invention should therefore not be seen as limited to the particular embodiment described herein, but rather, it should be understood that the present invention has wide applicability with respect to multi-user applications generally. All modifications, variations, or equivalent arrangements and implementations that are within the scope of the attached claims should therefore be considered within the scope of the invention.

We claim:

1. A method of controlling communication ports for an online session of a multi-user application, comprising:

opening multiple communication ports on a first network computer executing the multi-user application, through which the multi-user application can send communication signals to other network computers that are participating in the online session;

associating each of the communication ports of the first network computer with a protocol such that communication signals that the multi-user application sends and receives will conform to the protocol of each of the communication ports, wherein the multi-user application performs the associating;

designating an active communication port through which the multi-user application will send and receive communication signals for the first network computer, wherein the designating comprises selecting one of the multiple open communication ports on the first network computer; and sending a communication signal from the first network computer to one or more of the other network computers participating in the online session, wherein the communication signal from the first network computer identifies the active communication port and the associated protocol for the first network computer.

2. A method as defined in claim 1, additionally comprising changing the active communication port for the first network computer based upon a change in a communication configuration of the online session, wherein the multi-user application performs the changing.

3. A method as defined in claim 2, wherein the communication configuration changes from a peer-to-peer configuration to a client-server configuration.

4. A method as defined in claim 2, wherein the communication configuration changes from a client-server configuration to a peer-to-peer configuration.

5. A method as defined in claim 2, additionally comprising sending a communication configuration change signal to another one of the network computers participating in the online session, wherein the communication configuration change signal includes a notification that the communication configuration of the online session has changed.

6. A method as defined in claim 1, additionally comprising receiving a communication signal from a second network computer participating in the online session, wherein the communication signal from the second network identifies an active communication port and an associated communication protocol for the second network computer.

7. A method as defined in claim 6, wherein the sending the communication signal from the first network computer to one or more of the other network computers participating in the online session comprises appending active port and protocol data to the communication signal received from the second network computer to form a new communication signal and then sending the new communication signal to another one of the network computers that is participating in the online session.

8. A method as defined in claim 1, additionally comprising maintaining a record that identifies an active communication port and associated protocol for the other network computers that are participating in the online session.

9. A method as defined in claim 1, wherein:
the designating further comprises determining at the first network computer which of the multiple communication protocols associated with the multiple open communication ports is best suited for a communication configuration of the online session; and
the selecting further comprises selecting the one of the multiple open ports associated with the best suited communication protocol as the active port.

10. A method of controlling switching of communication ports for an online session of a multi-user application, comprising:
opening multiple communication ports on a first network computer executing the multi-user application, through which the multi-user application can send communication signals to other network computers that are participating in the online session, wherein the other network computers store the multi-user application;
associating each of the communication ports of the first network computer with a protocol such that communication signals that the multi-user application sends and receives will conform to the protocol of each of the communication ports, wherein the multi-user application performs the associating;
designating an active communication port through which the multi-user application will send and receive communication signals for the first network computer, wherein the designating comprises selecting one of the multiple open communication ports on the first network computer;
sending a communication signal from the first network computer to one or more of the other network computers participating in the online session, wherein the communication signal from the first network computer identifies the active communication port and the associated protocol for the first network computer;
receiving a configuration change message from another one of the other network computers participating in the online session, the configuration change message indicating that a communication configuration of the online session has changed; and
designating a new active communication port based upon the changed communication configuration of the online session, wherein the multi-user application performs the designating.

11. A method as defined in claim 10, additionally comprising receiving a communication signal from a second network computer participating in the online session, wherein the communication signal from the second network computer identifies an active communication port and an associated communication protocol for the second network computer.

12. A method as defined in claim 11, wherein the sending the communication signal from the first network computer to one or more of the other network computers participating in the online session comprises appending active port and protocol data to the communication signal received from the second network computer to form a new communication signal and then sending the new communication signal to another one of the network computers that is participating in the online session.

13. A method as defined in claim 10, wherein the configuration change message includes a notification that the communication configuration changed from a peer-to-peer configuration to a client-server configuration.

14. A method as defined in claim 10, wherein the configuration change message includes a notification that the communication configuration changed from a client-server configuration to a peer-to-peer configuration.

15. A method as defined in claim 10, additionally comprising forwarding the configuration change message to another one of the network computers participating in the online session.

16. A method as defined in claim 10, additionally comprising maintaining a record that identifies an active communication port and associated protocol for the other network computers that are participating in the online session.

17. A system that controls switching of communication ports for an online session of a multi-user application, the system comprising one or more processors that execute program instructions of the multi-user application and receive a data set, wherein the program instructions are recorded in a computer-readable media and cause the system to perform operations including:
opening multiple communication ports on a first network computer executing the multi-user application, through which the multi-user application can send communication signals to other network computers that are participating in the online session;
associating each of the communication ports of the first network computer with a protocol such that communication signals that the multi-user application sends and receives will conform to the protocol of each of the communication ports;

designating an active communication port through which the multi-user application will send and receive communication signals for the first network computer, wherein the designating comprises selecting one of the multiple open communication ports on the first network computer; and sending a communication signal from the first network computer to one or more of the other network computers participating in the online session, wherein the communication signal from the first network computer identifies the active communication port and the associated protocol for the first network computer.

18. A system as defined in claim 17, wherein the program instructions of the multi-user application cause the system to perform operations further including receiving a communication signal from a second network computer participating in the online session, wherein the communication signal from the second network computer identifies an active communication port and an associated communication protocol for the second network computer.

19. A system as defined in claim 18, wherein sending the communication signal from the first network computer to one or more of the other network computers participating in the online session comprises appending active port and protocol data to the communication signal received from the second network computer to form a new communication signal and then sending the new communication signal to another one of the network computers that is participating in the online session.

20. A system as defined in claim 17, wherein the program instructions of the multi-user application cause the system to perform operations further including changing the active communication port for the first network computer based upon a change in a communication configuration of the online session.

21. A program product for use in a computer system that executes program steps recorded in a computer-readable media to perform a method of controlling communication ports for an online session of a multi-user application, the program product comprising:

a media that can store program instructions; and a plurality of computer-readable instructions of the multi-user application that are stored on the media and are executable by the computer to perform a method comprising:

opening multiple communication ports on a first network computer executing the multi-user application, through which the multi-user application can send communication signals to other network computers that are participating in the online session;

associating each of the communication ports of the first network computer with a protocol such that communication signals that the multi-user application sends and receives will conform to the protocol of each of the communication ports;

designating an active communication port through which the multi-user application will send and receive communication signals for the first network computer, wherein the designating comprises selecting one of the multiple open communication ports on the first network computer; and sending a communication signal from the first network computer to one or more of the other network computers participating in the online session, wherein the communication signal from the first network computer identifies the active communication port and the associated protocol for the first network computer.

22. A system that controls switching of communication ports for an online session of a multi-user application, the system comprising one or more processors that execute program instructions of the multi-user application and receive a data set, wherein the program instructions are recorded in a computer-readable media and cause the system to perform operations including:

opening multiple communication ports on a first network computer executing the multi-user application, through which the multi-user application can send communication signals to other network computers that are participating in the online session, wherein the other network computers store the multi-user application;

associating each of the communication ports of the first network computer with a protocol such that communication signals that the multi-user application sends and receives will conform to the protocol of each of the communication ports;

designating an active communication port through which the multi-user application will send and receive communication signals for the first network computer, wherein the designating comprises selecting one of the multiple open communication ports on the first network computer;

sending a communication signal from the first network computer to one or more of the other network computers participating in the online session, wherein the communication signal from the first network computer identifies the active communication port and the associated protocol for the first network computer;

receiving a configuration change message from another one of the other network computers participating in the online session, the configuration change message indicating that a communication configuration of the online session has changed; and designating a new active communication port based upon the changed communication configuration of the online session.

23. A program product for use in a computer system that executes program steps recorded in a computer-readable media to perform a method of controlling communication ports for an online session of a multi-user application, the program product comprising:

a media that can store program instructions; and a plurality of computer-readable instructions of the multi-user application that are stored on the media and are executable by the computer to perform a method comprising:

opening multiple communication ports on a first network computer executing the multi-user application, through which the multi-user application can send communication signals to other network computers that are participating in the online session, wherein the other network computers store the multi-user application;

associating each of the communication ports of the first network computer with a protocol such that communication signals that the multi-user application sends and receives will conform to the protocol of each of the communication ports;

designating an active communication port through which the multi-user application will send and receive communication signals for the first network computer, wherein the designating comprises selecting one of the multiple open communication ports on the first network computer;

sending a communication signal from the first network computer to one or more of the other network computers participating in the online session, wherein the communication signal from the first network computer identifies the active communication port and the associated protocol for the first network computer;

receiving a configuration change message from another one of the other network computers participating in the online session, the configuration change message indicating that a communication configuration of the online session has changed; and designating a new active communication port based upon the changed communication configuration of the online session.

* * * * *

UNITED STATES PATENT AND TRADEMARK OFFICE
CERTIFICATE OF CORRECTION

PATENT NO. : 7,606,920 B2  Page 1 of 1
APPLICATION NO. : 10/211129
DATED : October 20, 2009
INVENTOR(S) : Van Datta et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1946 days.

Signed and Sealed this

Twelfth Day of October, 2010

David J. Kappos
*Director of the United States Patent and Trademark Office*